US006947873B2

(12) United States Patent
Ohgawara et al.

(10) Patent No.: US 6,947,873 B2
(45) Date of Patent: Sep. 20, 2005

(54) METHOD AND APPARATUS FOR GENERATING MEASUREMENT DATA

(75) Inventors: Takashi Ohgawara, Yokohama (JP); Koji Yamamoto, Kawasaki (JP); Eitarou Tambo, Fujisawa (JP); Masayuki Torimitsu, Tokyo (JP)

(73) Assignees: Toshiba Engineering Corporation, Kanagawa-ken (JP); Mitsui Bussan Plant & Project Corporation, Tokyo (JP)

( * ) Notice: Subject to any disclaimer, the term of this patent is extended or adjusted under 35 U.S.C. 154(b) by 0 days.

(21) Appl. No.: 09/940,413

(22) Filed: Aug. 27, 2001

(65) Prior Publication Data

US 2002/0026293 A1 Feb. 28, 2002

(30) Foreign Application Priority Data

Aug. 28, 2000 (JP) .................................. 2000-257963

(51) Int. Cl.[7] .......................... G06F 19/00; G06F 11/00; G01C 9/00
(52) U.S. Cl. ........................... 702/189; 702/2; 702/154; 702/188
(58) Field of Search ........................... 702/2, 5, 15, 85, 702/94, 95, 104, 127, 154, 188, 189, 1; 367/49

(56) References Cited

U.S. PATENT DOCUMENTS

| | | | | |
|---|---|---|---|---|
| 4,486,844 A | * | 12/1984 | Brunson et al. | 702/154 |
| 4,521,857 A | | 6/1985 | Reynolds, III | 379/88.17 |
| 5,245,656 A | * | 9/1993 | Loeb et al. | 713/154 |
| 5,378,429 A | * | 1/1995 | Hayashi et al. | 422/53 |
| 5,568,385 A | | 10/1996 | Shelton | 702/3 |
| 5,873,049 A | * | 2/1999 | Bielak et al. | 702/6 |
| 5,950,140 A | * | 9/1999 | Smith | 702/2 |
| 5,991,687 A | * | 11/1999 | Hale et al. | 701/207 |
| 6,061,299 A | | 5/2000 | Grouffal et al. | 367/49 |
| 6,560,565 B2 | * | 5/2003 | Roy et al. | 702/188 |
| 6,606,748 B1 | * | 8/2003 | Tomioka et al. | 725/50 |
| 2001/0011245 A1 | * | 8/2001 | Duhon | 705/38 |
| 2002/0026292 A1 | * | 2/2002 | Isami | 702/188 |

FOREIGN PATENT DOCUMENTS

| | | | | |
|---|---|---|---|---|
| GB | 2323668 A | | 9/1998 | |
| JP | 01016025 A | * | 1/1989 | H03M/1/36 |
| JP | 09184719 A | * | 7/1997 | G01C/7/02 |
| JP | 10112264 A | * | 4/1998 | H01J/9/44 |

OTHER PUBLICATIONS

Anthony J. Palicki (1992) "An Integrated GIS Solution For Seismic Hazard Mapping Systems", *Computer Technology Review*, vol. 12, No. 14, pp. 107–111.

* cited by examiner

Primary Examiner—Patrick Assouad
Assistant Examiner—Manuel L Barbee
(74) Attorney, Agent, or Firm—John P. White, Esq.; Cooper & Dunham LLP

(57) ABSTRACT

In a system for observing the ground based on various data items measured at one or more observation points by at least one measuring instrument, the measured data items are collected in a collection center, it is determined whether at least one of the measured data items is abnormal based on expert knowledge, a re-measurement instruction is given to the measuring instrument in a case where at least one of the measured data items is abnormal, and the measured data items are edited according to contract conditions for each user to generate measurement data for users in a case where it is determines that the measuring instrument does not malfunction as a result of re-measurement. Thus, the measurement data satisfying users' demands can be generated with good quality and high reliability, based on the measurement data items obtained at one or more observation points.

4 Claims, 7 Drawing Sheets

METHOD AND APPARATUS FOR GENERATING MEASUREMENT DATA

CROSS-REFERENCE TO RELATED APPLICATIONS

This application is based upon and claims the benefit of priority from the prior Japanese Patent Application No. 2000-257963, filed Aug. 28, 2000, the entire contents of which are incorporated herein by reference.

BACKGROUND OF THE INVENTION

1. Field of the Invention

The present invention relates to a measurement data generating apparatus and a measurement data generating method applied to a system for observing a ground based on various data items measured at one or more observation points by at least one measuring instrument.

2. Description of the Related Art

Recently, for the purpose of monitoring a displacement of ground, ground displacement measuring instruments are provided at one or more observation points of mountain-ringed regions and the like. Data items measured by each of the measuring instruments, such as an amount of displacement of ground and an angle of inclination, are transmitted to an unattended base station by radio waves. Also, data items measured by a pluviometer, an inclinometer, an extensometer, and a water level gauge are transmitted to the base station via a communication line.

The base station sends the measured data items, which are transmitted from the respective measuring instruments, to a collection center via a communication line and monitors a displacement of ground based on the measured data items collected in the collection center.

Not all the measured data items sent to the collection center from the base station are open to public. Disaster information is simply open to public based on some of the measured data items.

Consequently, even though a user wishes to know an objective measurement result based on the measured data items collected at the collection center, he or she usually encounters difficulties acquiring necessary data.

Some of the measured data items collected at the collection center are decreased in reliability due to noise. The decrease in reliability may cause an error in determination and prevent the ground from being observed with high reliability and high precision.

It is thus required that measurement data satisfying users' demands be generated with high quality and high reliability, based on various data items measured at one or more observation points.

BRIEF SUMMARY OF THE INVENTION

Accordingly, it is an object of the present invention to provide a method for generating measurement data satisfying users, demands with high quality and high reliability, based on various data items measured at one or more observation points, and an apparatus for doing the same.

According to one aspect of the present invention, there is provided a measurement data generating method applied to a system for observing a ground based on various data items measured at one or more observation points by at least one measuring instrument, the method comprising the steps of: collecting the measured data items in a collection center; and generating measurement data for users, which is obtained by editing the measured data items according to contract conditions for each user.

According to another aspect of the present invention, there is provided a measurement data generating apparatus applied to a system for observing a ground based on various data items measured at one or more observation points by at least one measuring instrument, the apparatus comprising: collecting means for collecting the measured data items in a collection center; and generating means for generating measurement data for users, which is obtained by editing the measured data items according to contract conditions for each user.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will now be described with reference to the accompanying drawings.

Figure 1:
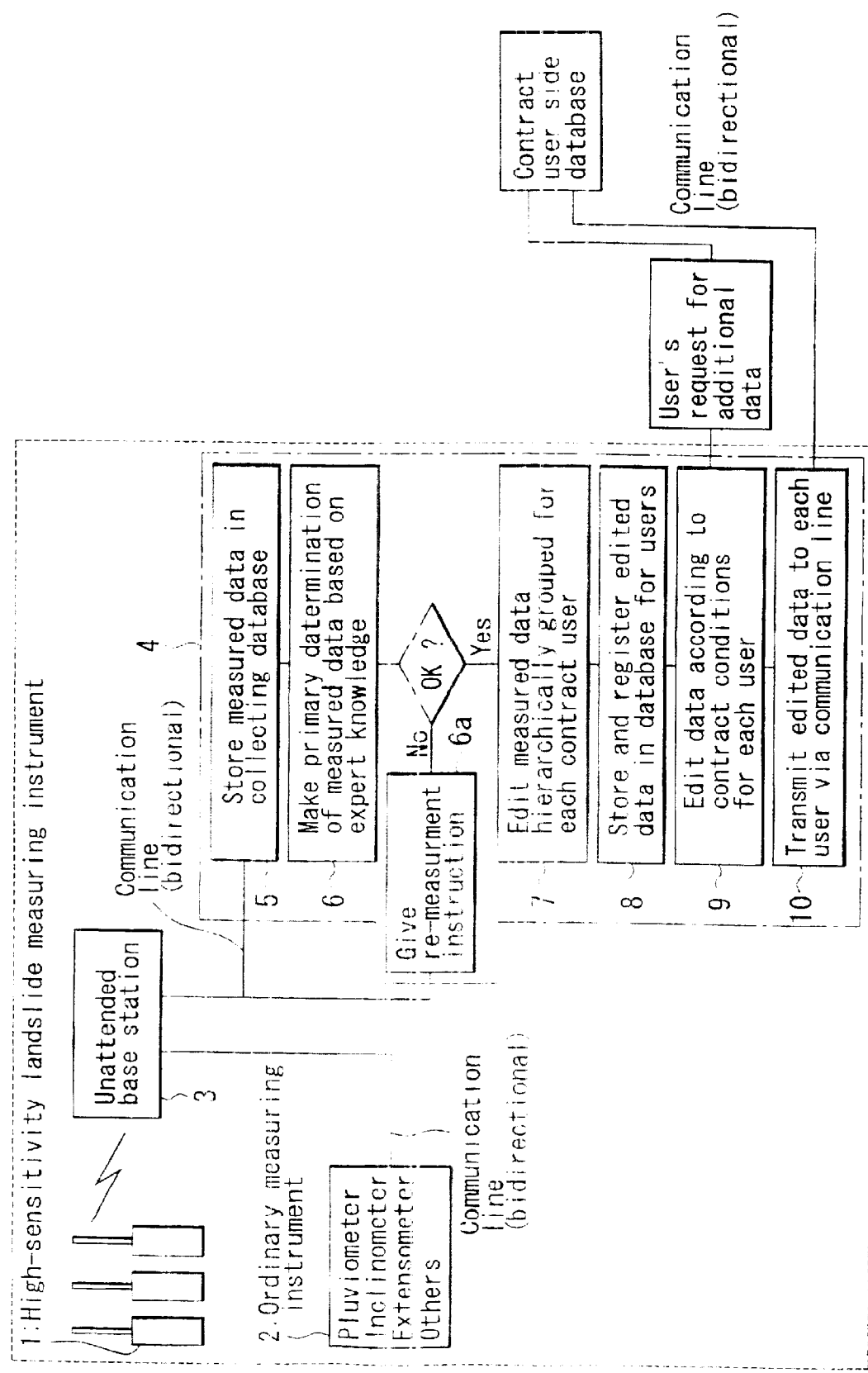
FIG. 1 is a functional block diagram for explaining a measurement data generating method according to a first embodiment of the present invention.

FIG. 1 is a functional block diagram for explaining a measurement data generating method according to a first embodiment of the present invention.

In FIG. 1, reference numeral 1 indicates a plurality of high-precision landslide measuring instruments that are provided at observation points of mountain-ringed regions and the like. The measuring instruments 1 measure an amount of displacement of ground, acceleration, an angle of inclination, and the like using a GPS and a gyroscope and then transmit these measured data items to an unattended base station 3 by radio waves. Reference numeral 2 denotes an ordinary measuring instrument provided near each of the landslide measuring instruments 1. The ordinary measuring instrument 2 transmits data items, which are measured by a pluviometer, an inclinometer, an extensometer, a water level gauge, and the like, to the base station 3 via a bidirectional communication line.

The base station 3 transmits various data items, which are measured and transmitted from the measuring instruments 1 and 2, to a collection center 4 (simply referred to as a center 4 hereinafter) via a bidirectional communication line.

The measured data items collected in the center 4 are processed by a computer (not shown) and stored in a measured data collecting database 5. Then, the measured data items are supplied from the database 5 to a primary determination section 6 in sequence. The section 6 makes a primary determination of the measured data items based on the following expert knowledge.

Figure 2:
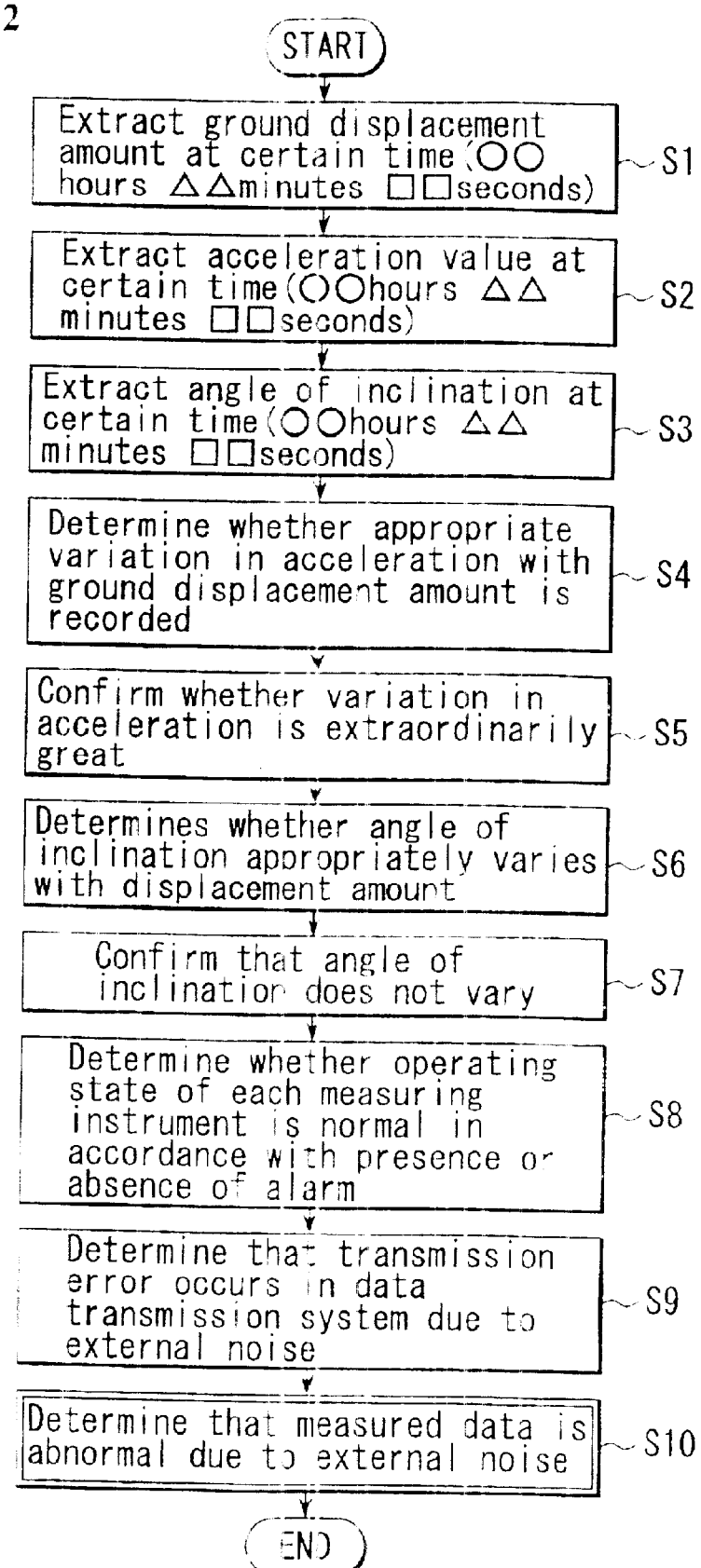
FIG. 2 is a flowchart showing an example of a process of making a primary determination of abnormality of measured data items in the first embodiment.

FIG. 2 is a flowchart showing an example of a process of making a primary determination of abnormality of measured data items.

Figure 3A:
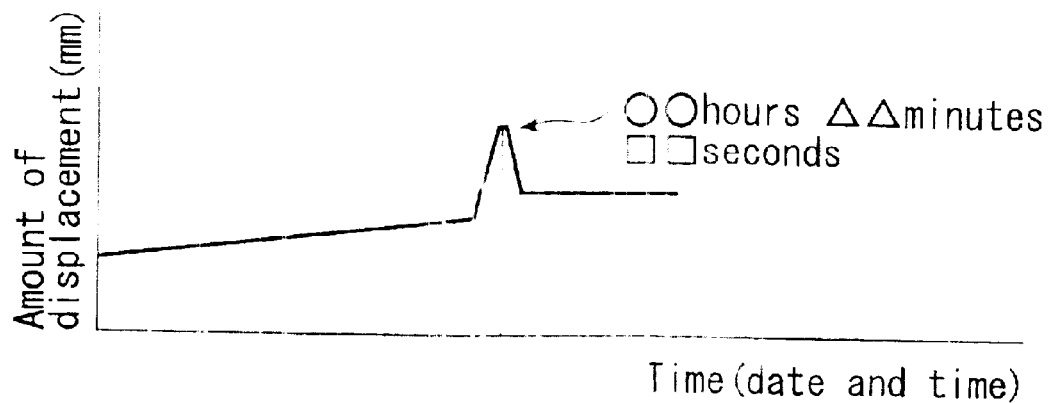
FIGS. 3A to 3C are measurement graphs for primary determination in the first embodiment.
Figure 3B:
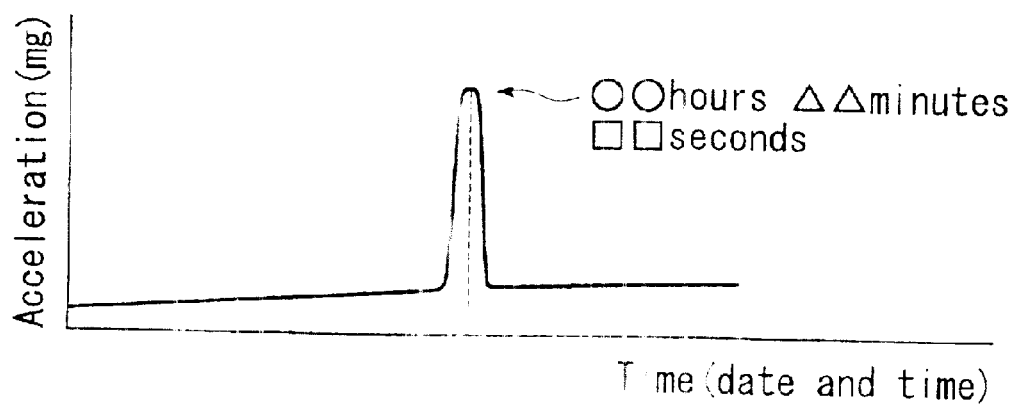
Figure 3C:
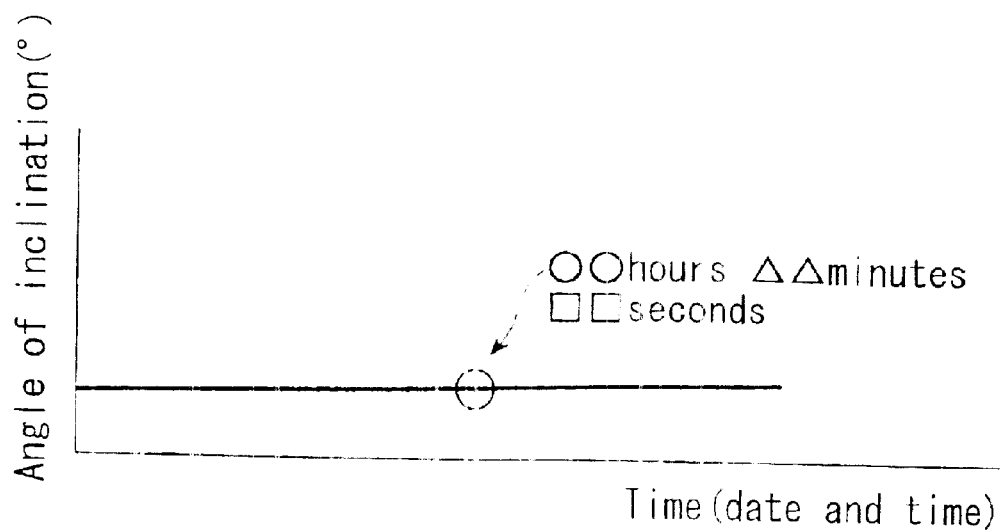

As shown in FIG. 2, an amount of displacement of ground is extracted at certain time in step S1, an acceleration value is extracted at the same time in step S2, and an angle of inclination of the inclinometer is extracted at the same time in step S3. These extracted values are shown in FIGS. 3A to 3C. FIG. 3A is a measurement graph of an amount of displacement of ground, FIG. 3B is that of acceleration of displacement of ground, and FIG. 3C is that of angle of inclination of the inclinometer.

In step S4, the primary determination section 6 determines whether an appropriate variation in acceleration with an amount of displacement of ground is recorded or not. If not, the section 6 confirms whether the variation in acceleration is extraordinarily great in step S5 and determines whether an angle of inclination appropriately varies with the amount of displacement in step S6.

If the angle of inclination does not appropriately vary with the amount of displacement, the section 6 confirms that the angle of inclination does not vary in step S7. After that, in step S8, it determines whether an operating state of each measuring instrument is normal or not in accordance with the presence or absence of an alarm. If the operating state is normal, the section 6 determines that a transmission error occurs in a data transmission system due to external noise in step S9 and then determines that at least one of the measured data items is abnormal due to the external noise in step S10.

The foregoing case is directed to the abnormality of the measured data items due to external noise. The malfunction of the measuring instruments 1 and transmission systems is also determined based on the expert knowledge.

As described above, if data determined by the primary determination section 6 is abnormal, a re-measurement instructing section 6a shown in FIG. 1 gives a re-measurement instruction to the unattended base station 3 so that re-measured data items are supplied to the measured data collecting database 5.

The measured data items stored in the database 5 are supplied to a user-by-user editing section 7 and hierarchically grouping in editing for each user on condition that the measured data items are normal.

Figure 4A:
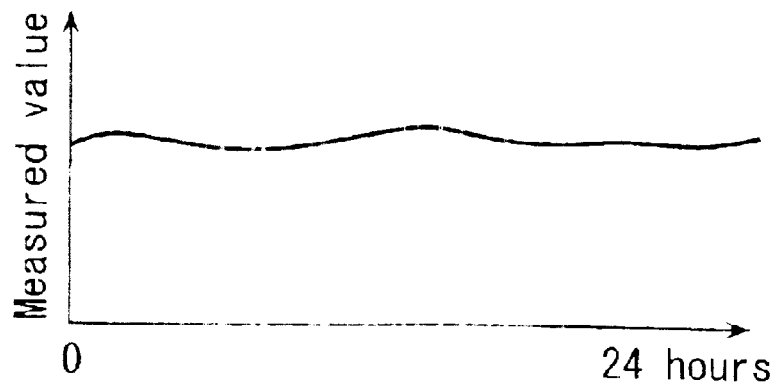
FIGS. 4A to 4C are graphs showing examples of measurement data obtained by hierarchically grouping the measured data items in editing.
Figure 4B:
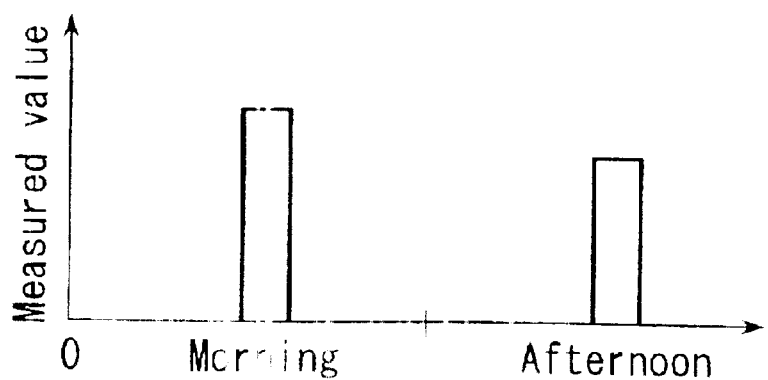
Figure 4C:
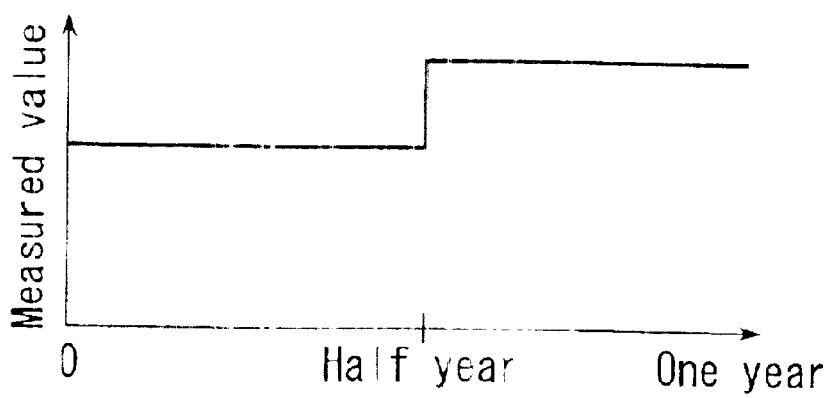

FIGS. 4A to 4C show examples of measurement data obtained by hierarchically grouping the measured data items in editing. FIG. 4A is directed to A-ranked users who require data items measured 24 hours every day, FIG. 4B is directed to B-ranked users who require data items measured twice morning and afternoon every day, and FIG. 4C is directed to C-ranked users who require data items every half year.

The data items hierarchically grouped in editing for each contract user in the user-by-user editing section 7 are stored in a user editing database 8.

The edited data items stored in the database 8 are supplied to a user-by-user editing section 9 and edited according to contract conditions for each user. The edited data items are transmitted to each user from a transmitting section 10 through a communication line.

The above operations are processing and editing of measured data items in the center 4. Even when a contract user requests additional data items, it is edited and transmitted for each user as described above.

Figure 5:
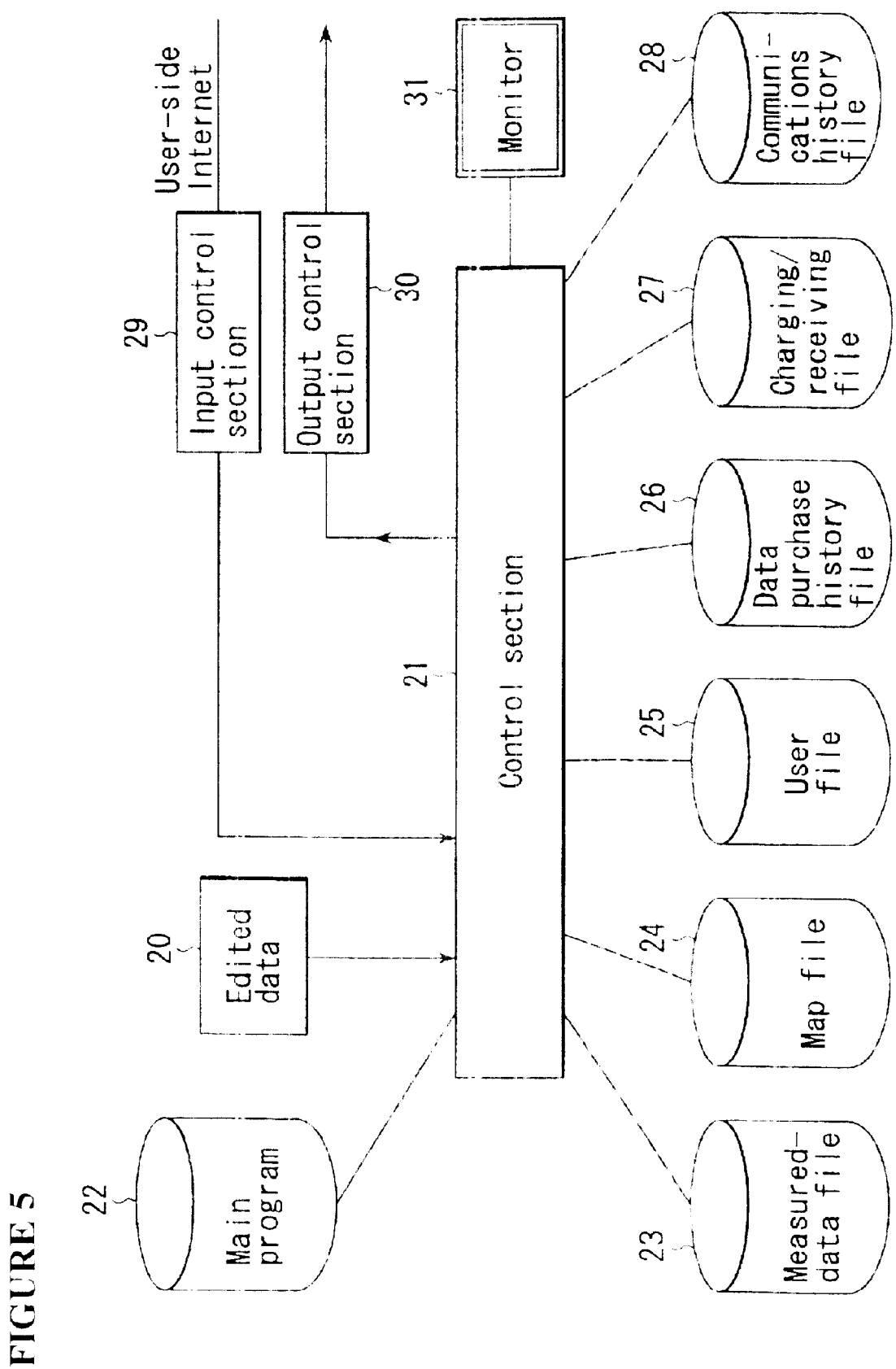
FIG. 5 is a block diagram showing an example of a data sales system including a computer for controlling writing or reading of data in a file.

FIG. 5 is a block diagram showing an example of a data sales system including a computer for controlling writing or reading of data in a file, which is prepared for measurement data for sale to contract users.

FIG. 5 shows a control section 21 for performing control by a main program 22, a measurement data file 23 to which data 20 obtained by hierarchically grouping various measurement data items for each contract user and by editing them according to the contract conditions for each user is written, a map file 24 to which map information of observation points and the like is written, a user file 25 to which contract users and contract conditions are written, a data purchase history file 26, a charging/receiving file 27, and a communications history file 28.

The control section 21 is equipped with an input control section 29 for receiving measured data items input via the Internet and an output control section 30 for transmitting data corresponding to the contract conditions from the measurement data file 23 and the map file 24 to a user through the Internet.

FIG. 5 also shows a monitor 31 for displaying data written to or read out of each of the files.

Figure 6:
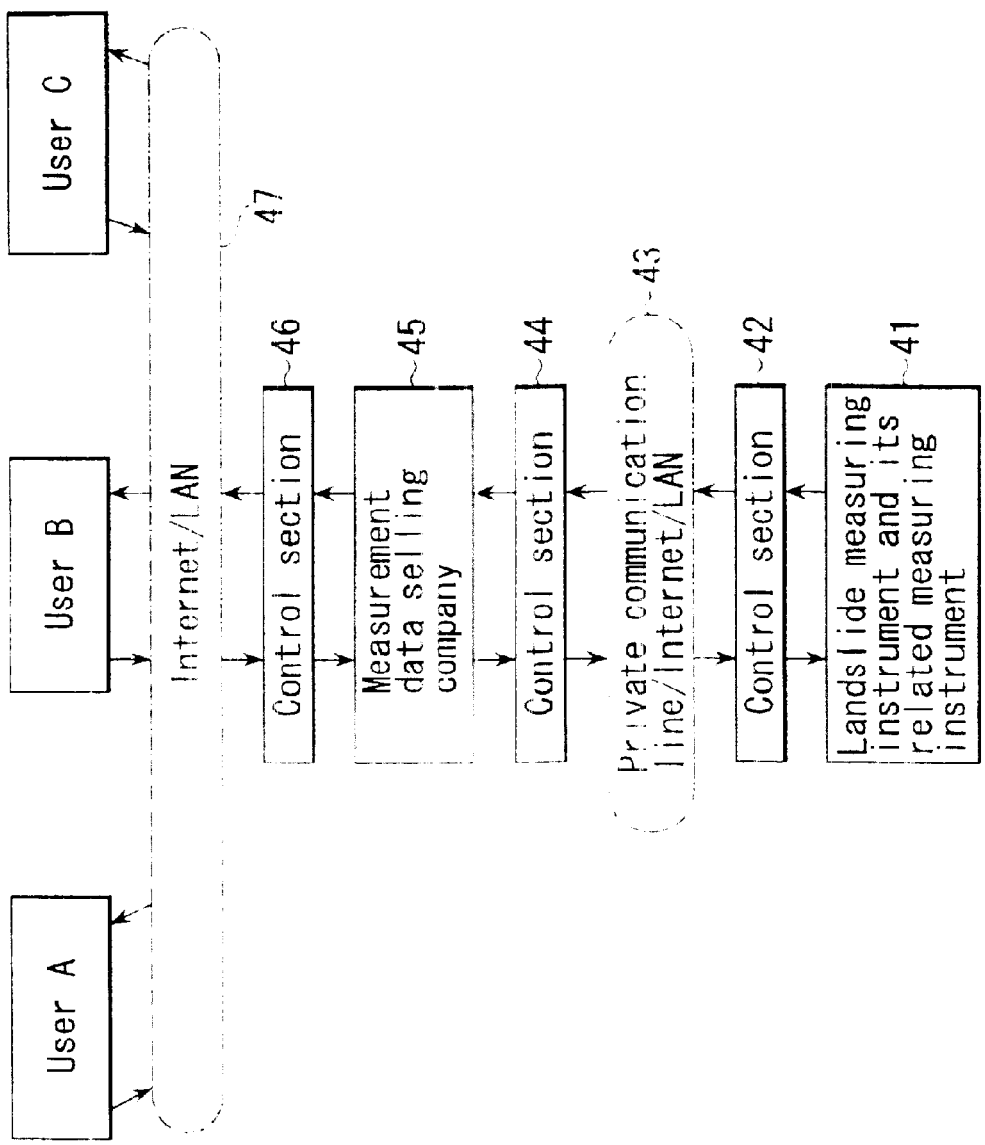
FIG. 6 is a schematic diagram of the entire system for selling measurement data generated.

FIG. 6 shows the entire system for processing and editing various data items measured at one or more observation points and selling them as measurement data.

In FIG. 6, reference numeral 41 denotes a landslide measuring instrument and its related measuring instrument including a pluviometer and the like. These instruments 41, which are controlled by a control section 42 for setting observation conditions, carry out measurement by a predetermined process and a control method and collect measured data items through a private communication line (or the Internet or LAN) 43. These data items are transmitted to a center 45 for processing them through a control section 44.

As has been described referring to FIG. 1, in the center 45, the measured data items are primarily determined and hierarchically grouped for each contract user. Further, the measured data items are edited according to the contract conditions for each user, and the edited data items are sequentially stored in the database as measurement date for sale.

The measurement data for sale, which is generated by processing and editing various measured data items for observing a landslide, is sold to users A, B and C via the Internet (or LAN) 47 by a control section 46.

For example, the user A is a local public body of municipalities, the user B is a government or its related agencies, and the user C is a private company and an individual.

In the first embodiment, as described above, various data items measured at one or more observation points are collected in the center. These measured data items are primarily determined based on the expert knowledge to obtain the data items not including noise. After that, the data items are hierarchically grouped for each contract user and edited according to the contract conditions for each user to generate measurement data for sale.

Consequently, measurement data satisfying users' demands can be generated with high quality and high reliability, based on various data items measured at one or more observation points.

Figure 7:
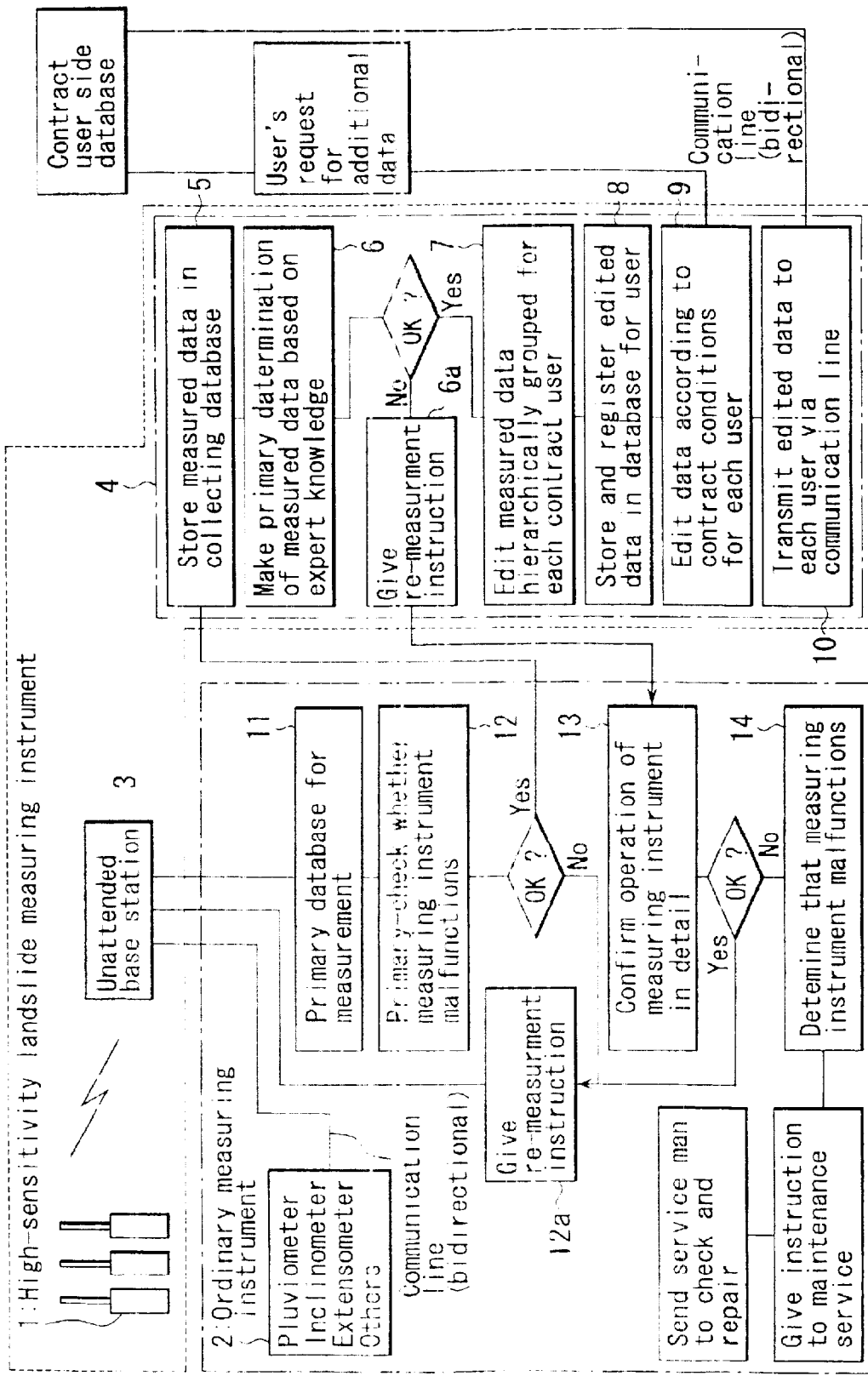
FIG. 7 is a functional block diagram for explaining a measurement data generating method according to a second embodiment of the present invention.

FIG. 7 is a functional block diagram for explaining a measurement data generating method according to a second embodiment of the present invention. The same constituting elements as those of the first embodiment are denoted by the same reference numerals and their detailed descriptions are omitted. The elements other than those of the first embodiment will be described below.

In the second embodiment, the measured data items of the measuring instruments 1 sent to the base station 3 and the measured data items of the ordinary measuring instrument 2 are not directly transmitted to the center 4 but to a data management section. In the data management section, the measurement data items sent from the base station 3 are stored in a primary database 11 for measurement. Then, a measurement-operation primary checking section 12 checks whether each measuring instrument malfunctions, based on the measured data items. If the section 12 determines that each of the measuring instruments 1 does not malfunction, the measured data items are transmitted to the center 4.

If the section 12 determines that at least one of the measuring instruments malfunctions, a re-measurement instructing section 12a gives a re-measurement instruction to the corresponding measuring instrument through the base station 3.

In the center 4, a primary determination section 6 makes a primary determination of the measured data items based on the expert knowledge. If at least one of the measured data items is abnormal, the section 5 gives a re-measurement instruction to a measurement-operation confirming section 13 of the data management section. The section 13 confirms an operation of the measuring instruments in detail. If the corresponding measuring instrument does not malfunction, the section 13 gives a re-measurement instruction to the corresponding measuring instrument through the base station 3 as described above. If a determination section 14 determines that the measuring instrument malfunctions, it gives an instruction to a maintenance service center to send a service person to have him or her check and repair the malfunctioning measuring instrument.

As has been described above, the measured data items of the high-precision landslide measuring instruments 1 and measured data items of the normal measuring instrument 2 are not directly transmitted to the center 4 but to the data management section. In the data management section, it is checked whether the measuring instruments operate normally. If they operate normally, their measured data items are sent to the center 4; therefore, its reliability can be increased.

When a re-measurement instruction is sent to the data management section from the center 4, an operation of the measuring instrument is confirmed in detail. If the measuring instrument does not malfunction, the re-measurement instruction is issued. If the measuring instrument malfunctions, it is checked and repaired; therefore, high-quality and high-reliability measured data can always be obtained.

The foregoing embodiment is directed to processing of measurement data used for monitoring a landslide. However, it is possible to process measurement data used for observing a displacement of ground due to an earthquake or the like.

According to the present invention described above in detail, measurement data satisfying users' demands can be generated with high quality and high reliability, based on various data items measured at one or more observation points.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A measurement data generating method applied to a system for observing a ground based on various data items measured at observation points by a plurality of measuring instruments, the method comprising the steps of:

(a) determining whether an operating state of each measuring instrument is normal or abnormal based on the measured data items obtained from the plurality of measuring instruments;

(b) giving a re-measurement instruction to a measuring instrument whose operating state is determined to be abnormal in step (a)

(c) storing the measured data items in a first database in sequence for each observation point;

(d) storing user contract information for each contract user who requires the measured data items in a second database, the contract information in the second database containing information of required observation points, information of required data items, and information of required observation time;

(e) editing measured data items satisfying requirements of the contract users by using the measured data items stored in the first database in accordance with the user contract information stored in the second database; and (f) transmitting the edited data items to the contract users.

2. The method according to claim 1, wherein the information of required observation time indicates at least one of time unit of hour, time unit of morning/afternoon, time unit of half year/one year.

3. A measurement data generating method applied to a system for observing a ground based on various data items measured at observation point by a plurality of measuring instruments, the method comprising the steps of:

(a) determining whether an operating state of each measuring instrument is normal or abnormal based on the measured data items obtained from the plurality of measuring instruments;

(b) giving a re-measurement instruction to a measuring instrument whose operating state is determined to be abnormal in step (a)

(c) determining the measuring instrument given the re-measurement instruction malfunctions if the operation state is again determined to be abnormal after re-measurement;

(d) determining whether data items measured by the measuring instrumement whose operating state are determined to be normal in step (a), are normal or abnormal based on relationship of the measured data items;

(e) storing the measured data items determined to be normal in step (d) in a first database in sequence for each observation point;

(f) storing user contract information for each contract user who requires the measured data items in a second database, the contract information in the second database containing information of required observation points, information of required data items, and information of required observation time;

(g) editing measured data items satisfying requirements of the contract users by using the measured data items stored in the first database in accordance with the user contract information stored in the second database; and (h) transmitting the edited data items to the contract users.

4. The method according to claim 3, wherein the information of required observation time indicates at least one of time unit of hour, time unit of morning/afternoon, time unit of half year/one year.

* * * * *